United States Patent
Chang et al.

(10) Patent No.: US 9,853,469 B2
(45) Date of Patent: Dec. 26, 2017

(54) CHARGING SYSTEM

(71) Applicant: Quanta Computer Inc., Taoyuan (TW)

(72) Inventors: Jung-Wen Chang, Taoyuan (TW);
Pao-Hsien Chang, Taoyuan (TW);
Tsung-Hsueh Wu, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 155 days.

(21) Appl. No.: 15/089,152

(22) Filed: Apr. 1, 2016

(65) Prior Publication Data
US 2017/0222458 A1  Aug. 3, 2017

(30) Foreign Application Priority Data
Jan. 29, 2016  (TW) .............. 105201402 U (51) Int. Cl.
*H02J 7/00* (2006.01)
(52) U.S. Cl.
CPC .......... *H02J 7/0045* (2013.01); *H02J 7/0052* (2013.01)
(58) Field of Classification Search
CPC ................................... H02J 7/0045
USPC ........................................... 320/107
See application file for complete search history.

(56) References Cited

U.S. PATENT DOCUMENTS

| 2014/0159652 A1* | 6/2014 | Hall ............... H02J 7/025 320/108 |
| 2016/0105047 A1* | 4/2016 | Cui ............... H01R 13/6205 320/115 |
| 2016/0172890 A1* | 6/2016 | Jeong ............ H02J 7/04 320/108 |
| 2016/0197489 A1* | 7/2016 | Kurs ............. H01F 38/14 320/108 |

* cited by examiner

*Primary Examiner* — Suresh Memula
(74) *Attorney, Agent, or Firm* — McClure, Qualey & Rodack, LLP (57) ABSTRACT

A charging system is provided, including a charging device and an electronic device. The charging device includes a housing, a metal connector, a power supply source electrically connected to the metal connector, a first magnetic member, and a second magnetic member. The electronic device includes a main body, a power storage member, an electronic contact electrically connected to the power storage member, and a third magnetic member. The third magnetic member has a first surface and a second surface adjacent to the first surface. When the electronic device is disposed on the charging device, the metal connector contacts the electronic contact, the first surface faces the first magnetic member, and the second surface faces the second magnetic member.

10 Claims, 8 Drawing Sheets

CHARGING SYSTEM

CROSS REFERENCE TO RELATED APPLICATIONS

The present application is based on, and claims priority from, Taiwan Patent Application No. 105201402, filed on Jan. 29, 2016, the disclosure of which is hereby incorporated by reference herein in its entirety.

BACKGROUND OF THE INVENTION

Field of the Invention

The application relates in general to a charging system, and in particular, to a charging system having a magnetic member.

Description of the Related Art

A charging device and an electronic device in a conventional magnetic suction charging system usually have magnets, wherein there are the same number of magnets in the charging device as there are in the electronic device. For example, the charging device (such as a portable power bank) has one magnet, and the electronic device has one magnet corresponding to the magnet in the charging device. When the magnets attract each other, the charging device can connect to the electronic device. If a greater attractive force is needed, same amount of magnets can be added to the charging device and the electronic device.

However, electronic devices are miniaturized nowadays (such as a smartwatch or a smart ring), and the interior space thereof is reduced. A plurality of magnets cannot be disposed in these electronic devices. Therefore, when an electronic device connects to a charging device, the electronic device may fall due to the attractive force being insufficient.

BRIEF SUMMARY OF INVENTION

To address the deficiencies of conventional products, an embodiment of the invention provides a charging system, including a charging device and an electronic device. The charging device includes a housing, a metal connector, a power supply source electrically connected to the metal connector, a first magnetic member, and a second magnetic member. The first and second magnetic members and the metal connector are disposed on the housing. The electronic device includes a main body, a power storage member, an electronic contact electrically connected to the power storage member, and a third magnetic member. The power storage member, the electronic contact, and the third magnetic member are disposed on the main body. The third magnetic member has a first surface and a second surface adjacent to the first surface. When the electronic device is disposed on the charging device, the metal connector contacts the electronic contact, the first surface faces the first magnetic member, and the second surface faces the second magnetic member.

In some embodiments, the main body comprises a recess, and the first magnetic member protrudes from a surface of the housing, wherein when the electronic device is disposed on the charging device, at least a portion of the first magnetic member is accommodated in the recess.

In some embodiments, the housing comprises a depression, and the third magnetic member protrudes from a lateral surface of the main body, wherein when the electronic device is disposed on the charging device, at least a portion of the third magnetic member is accommodated in the depression.

In some embodiments, when the electronic device is disposed on the charging device, the distance between the central axis of the second magnetic member and the first magnetic member is shorter than the distance between the central axis of the third magnetic member and the first magnetic member.

In some embodiments, the third magnetic member has a predetermined length, and when the electronic device is disposed on the charging device, the distance between the central axis of the second magnetic member and the central axis of the third magnetic member is ½-⅕ of the predetermined length.

In some embodiments, when the electronic device is disposed on the charging device, the S pole of the first magnetic member faces the N pole of the third magnetic member, and the S pole of the second magnetic member and the N pole of the third magnetic member face a surface of the housing.

In some embodiments, when the electronic device is disposed on the charging device, the N pole of the first magnetic member faces the S pole of the third magnetic member, and the N pole of the second magnetic member and the S pole of the third magnetic member face a surface of the housing.

In some embodiments, when the electronic device is disposed on the charging device, the first magnetic member is aligned with the third magnetic member.

In some embodiments, the electronic device further comprises a film, when the electronic device is disposed on the charging device, the film is disposed between the first magnetic member and the third magnetic member.

In some embodiments, the power supply is a rechargeable battery or an external power source.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the charging system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
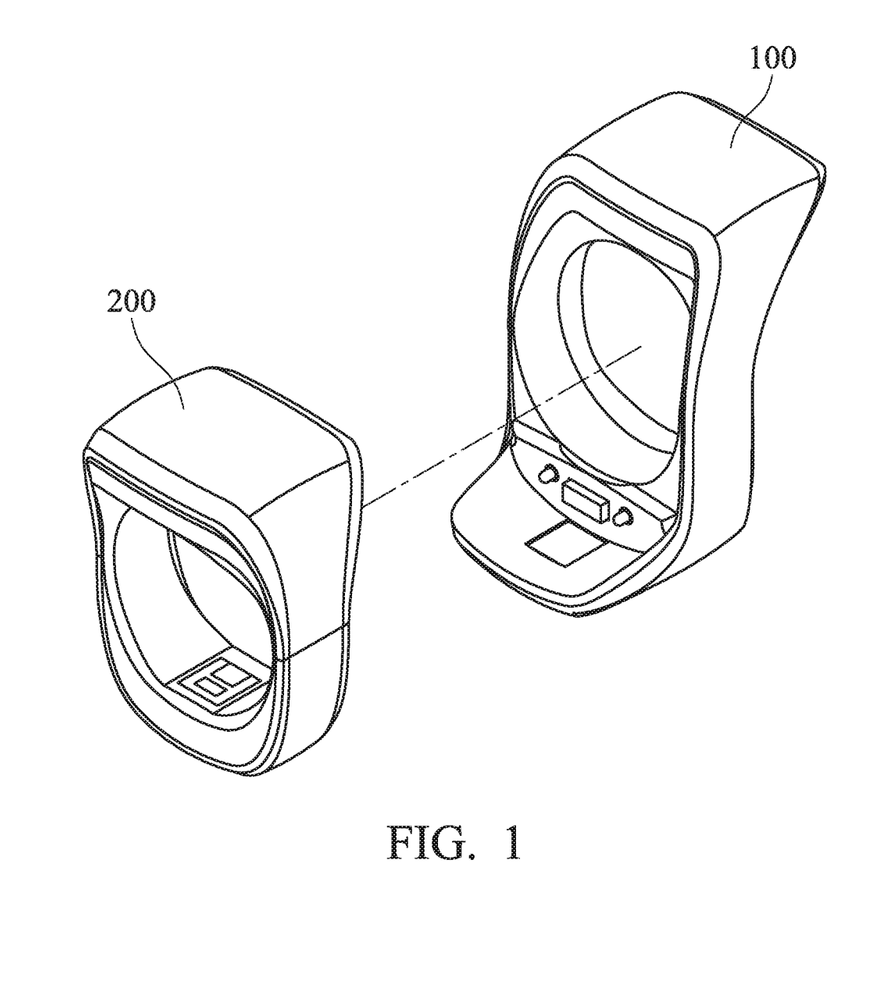
FIG. 1 is a schematic diagram of a charging system according to an embodiment of the invention.

First, referring to FIG. 1, a charging system in an embodiment of the invention comprises a charging device 100 and an electronic device 200, wherein the electronic device 200 is detachably connected to the charging device 100, and the charging device 100 can supply power to the electronic device 200. The electronic device 200 can be a smart ring, a smartwatch, a smart band, or other wearable computer.

Figure 2A:
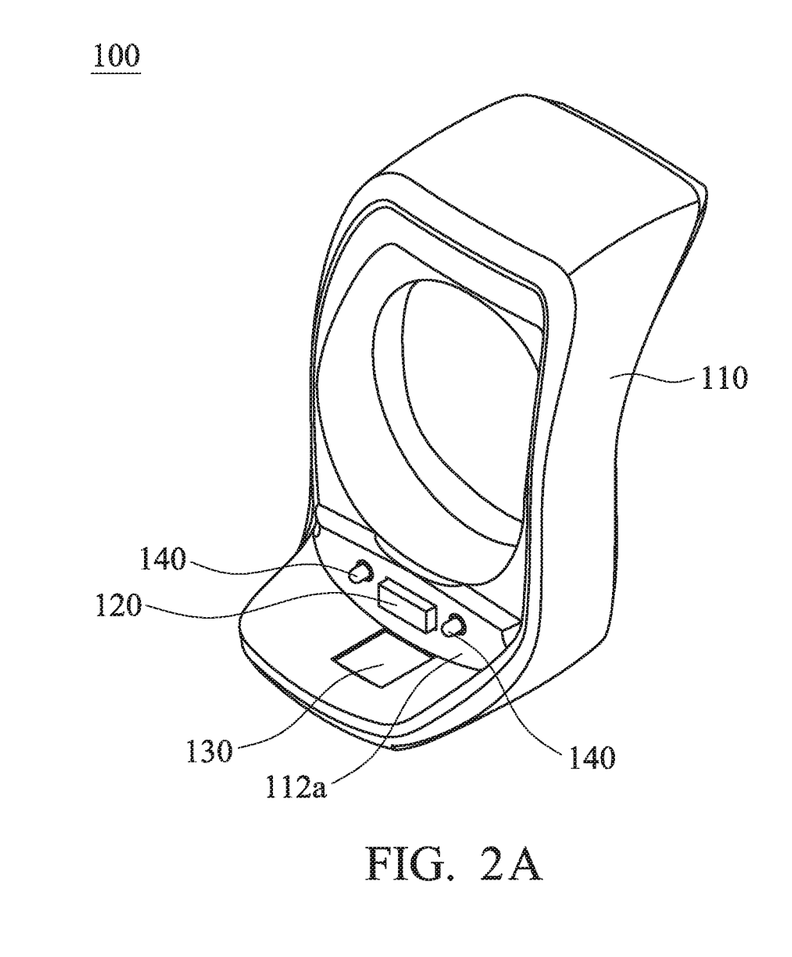
FIG. 2A is a schematic diagram of a charging device according to an embodiment of the invention.
Figure 2B:
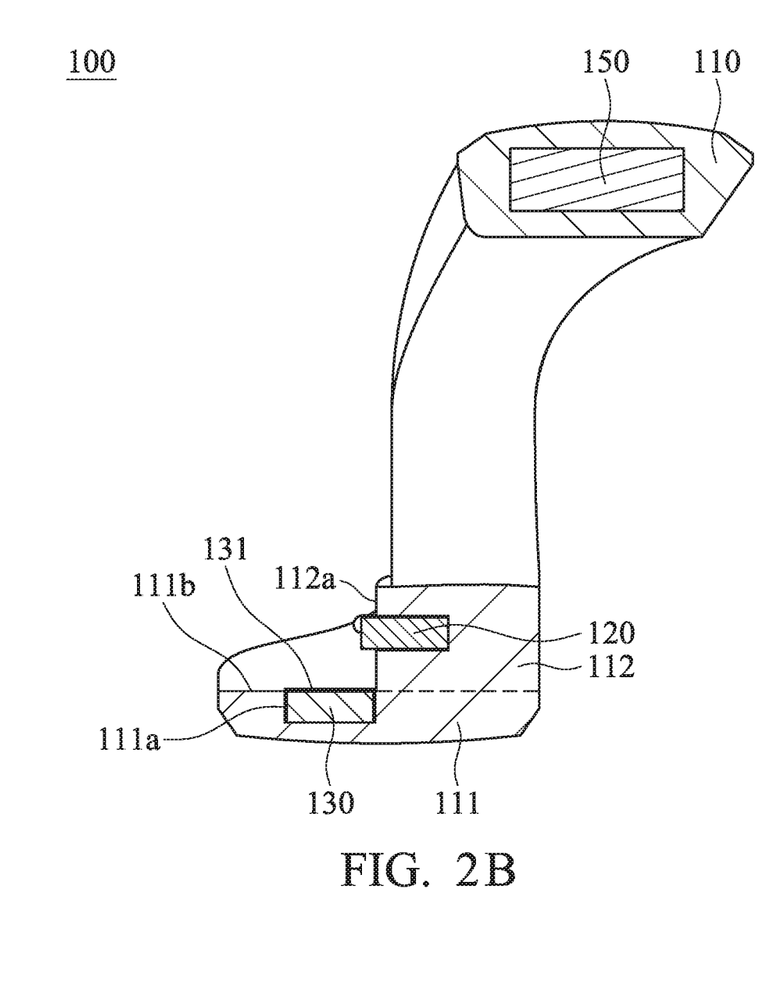
FIG. 2B is an exploded-view diagram of a charging device according to an embodiment of the invention.

As shown in FIGS. 2A and 2B, the charging device 100 primarily comprises a housing 110, a first magnetic member 120, a second magnetic member 130, at least one metal connector 140, and a power supply 150. The first magnetic member 120, the second magnetic member 130, the metal connector 140, and the power supply 150 are disposed on the housing 110, and the power supply 150 electrically connects the metal connector 140 (not shown).

The housing 110 substantially has an L-shaped structure, and can be divided into a first portion 111 and a second portion 112. The longitudinal axis of the first portion 111 is substantially perpendicular to that of the second portion 112. The first portion 111 has an accommodating space 111a and a bottom surface 111b. The second magnetic member 130 is disposed in the accommodating space 111a. In this embodiment, the top surface 131 of the second magnetic member 130 is aligned with the bottom surface 111b. Thus, a horizontal plane can be formed by the top surface 131 and the bottom surface 111b, and the electronic device 200 can easily be disposed on the charging device 100. The first magnetic member 120 and the metal connector 140 are disposed on the second portion 112, and protrude from a surface 112a of the second portion 112. The surface 112a is adjacent to the aforementioned horizontal plane.

Moreover, in this embodiment, the first magnetic member 120 is disposed between the two metal connectors 140 of the charging device 100.

Figure 3A:
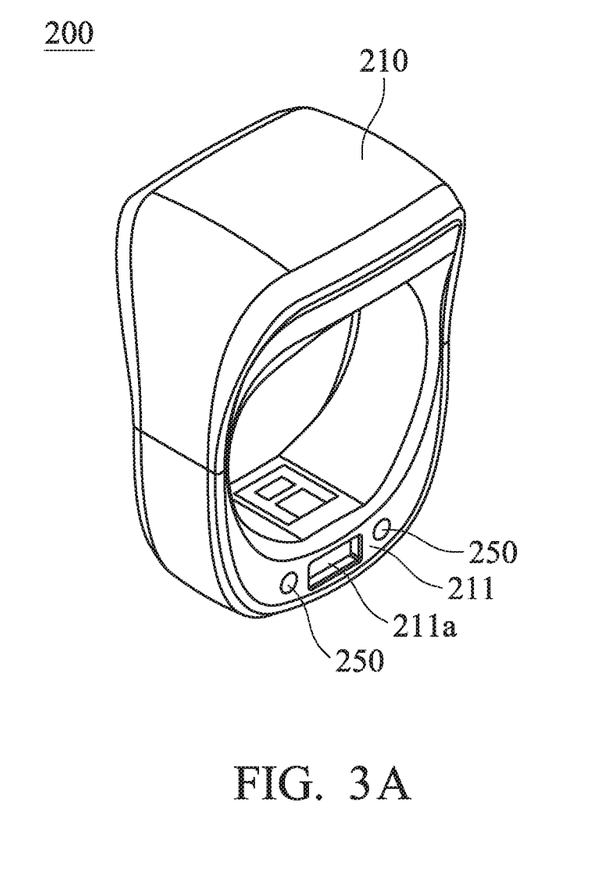
FIG. 3A is a schematic diagram of an electronic device according to an embodiment of the invention.
Figure 3B:
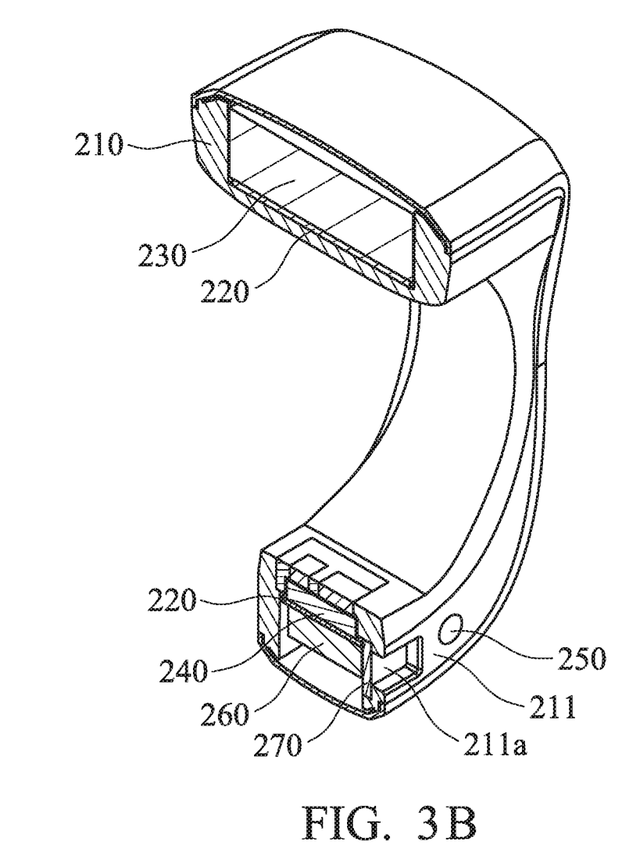
FIG. 3B is an exploded-view diagram of an electronic device according to an embodiment of the invention.

Referring to FIGS. 3A and 3B, the electronic device 200 primarily comprises a main body 210, a flexible printed circuit 220, a power storage member 230, a sensor 240, at least one electronic contact 250, a third magnetic member 260, and a film 270. The flexible printed circuit 220 is disposed in the main body 210 and has a substantially annular appearance, and electrically connects to the power storage member 230, the sensor 240 and the electronic contact 250. The power storage member 230 and the sensor 240 are also disposed in the main body 210. For example, the power storage member 230 can be a rechargeable battery. The sensor 240 can comprise a gravity sensor, a movement detector, a heart rate sensor, a temperature sensor, or a GPS module (Global Positioning System module) for detecting signals related to the user's movements, heart rate or position, to help the user to record relevant physiological and environmental information in his/her daily life.

The electronic contacts 250 are exposed from a lateral surface 211 of the main body 210, and a recess 211a is formed between two electronic contacts 250. The third magnetic member 260 is disposed in the main body 210, and the position of the third magnetic member 260 corresponds to the recess 211a. Furthermore, the film 270 is disposed between the third magnetic member 260 and the recess 211a.

In this embodiment, the flexible printed circuit 220 is disposed between the sensor 240 and the third magnetic member 260, such that the interference of the third magnetic member 260 can be prevented from the measurement of the sensor 240.

Figure 4:
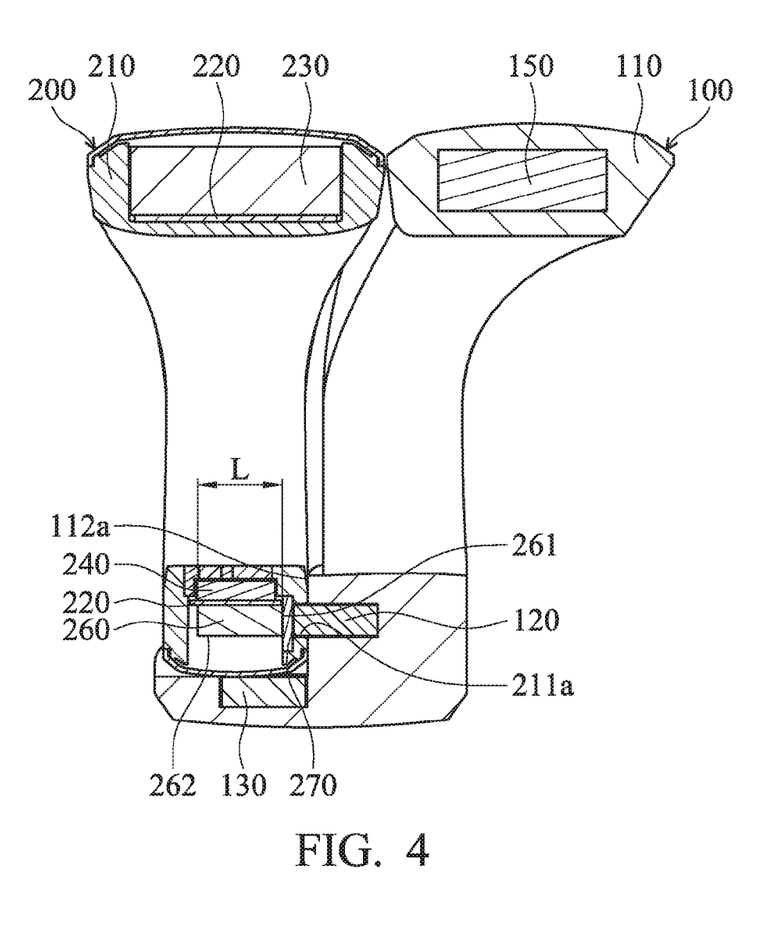
FIG. 4 is an exploded-view diagram of a charging system according to an embodiment of the invention.

Referring to FIG. 4, when the electronic device 200 is disposed on the charging device 100, a first surface 261 of the third magnetic member 260 faces toward the first magnetic member 120. Therefore, the magnetic attractive force between the first magnetic member 120 and the third magnetic member 260 can push the electronic device 200 to move right and contact the surface 112a of the housing 110. The second surface 262 of the third magnetic member 260 faces toward the second magnetic member 130. Therefore, the magnetic attractive force between the second magnetic member 130 and the third magnetic member 260 can push the electronic device 200 to move down and contact the aforementioned horizontal plane. Accordingly, the electronic device 200 can be disposed steadily on the charging device 100.

Furthermore, when the electronic device 200 is disposed on the charging device 100, the first magnetic member 120 is aligned with the third magnetic member 260, the portion of the first magnetic member 120 protruding from the surface 112a is accommodated in the recess 211a of the main body 210, and the film 270 is disposed between the first magnetic member 120 and the third magnetic member 260. Thus, the obstructions between the first magnetic member 120 and the third magnetic member 260 can be reduced, and the position of the electronic device 200 relative to the charging device 100 can be determined.

In this embodiment, when the electronic device 200 is disposed on the charging device 100, the second magnetic member 130 is not aligned with the first magnetic member 120. Specifically, the distance between the central axis of the second magnetic member 130 and the first magnetic member 120 is shorter than the distance between the central axis of the third magnetic member 260 and the first magnetic member 120. Therefore, the magnetic attractive force between the second magnetic member 130 and the third magnetic member 260 can also push the electronic device 200 to move right, and the combination between the charging device 100 and the electronic device 200 can be improved.

The third magnetic member 260 has a length L (predetermined length), and the distance between the central axis of the second magnetic member 130 and the central axis of the third magnetic member 260 can be $(\frac{1}{2})L$-$(\frac{1}{5})L$ (and preferably $(\frac{1}{3.5})L$-$(\frac{1}{4})L$).

In this embodiment, when the electronic device 200 is disposed on the charging device 100, the N pole of the third magnetic member 260 faces the S pole of the first magnetic member 120, and the N pole of the third magnetic member 260 and the S pole of the second magnetic member 130 face the surface 112a of the housing 110. In some embodiments, when the electronic device 200 is disposed on the charging device 100, the S pole of the third magnetic member 260 faces the N pole of the first magnetic member 120, and the S pole of the third magnetic member 260 and the N pole of the second magnetic member 130 face the surface 112a of the housing 110.

It should be noted that, when the electronic device 200 is disposed on the charging device 100, the metal connector 140 of the charging device 100 contacts the electronic contact 250 of the electronic device 200 (not shown). Therefore, the power supply 150 can supply power to the power storage member 230 through the metal connector 140, electronic contact 250, and flexible printed circuit 220. The power storage member 230 can store power therein.

Figure 5:
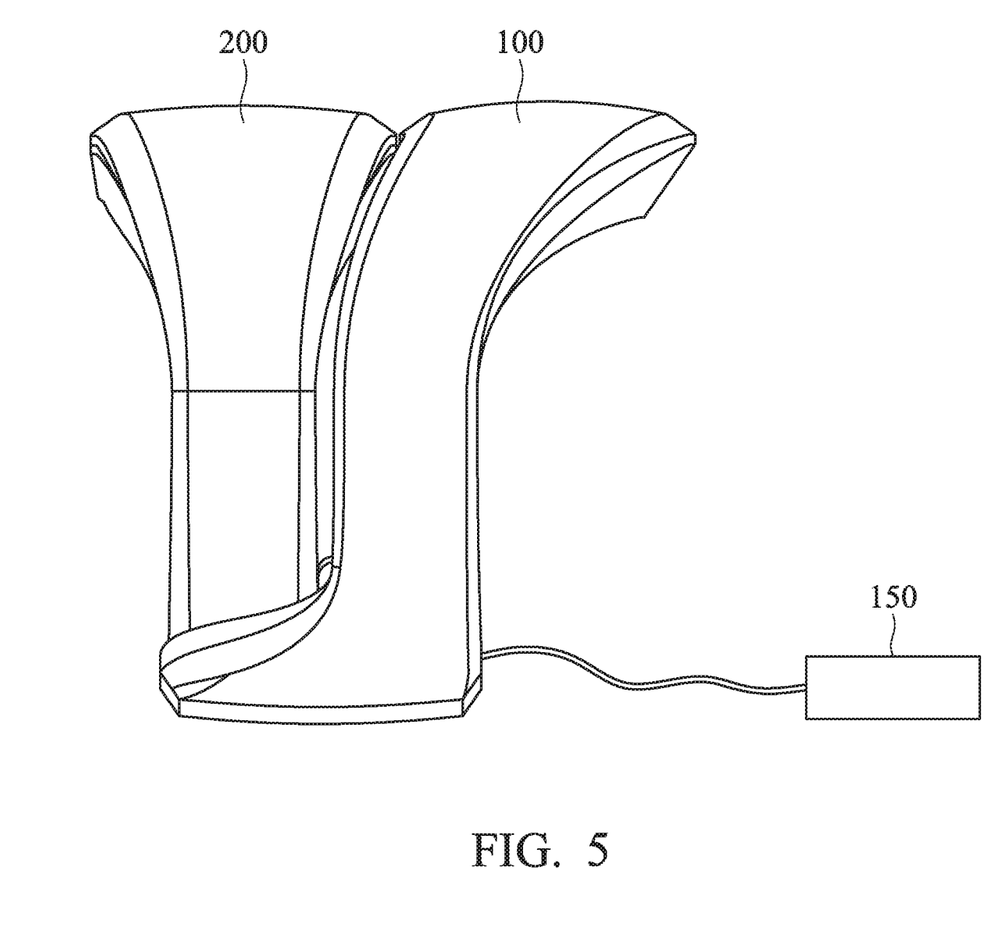
FIG. 5 is a schematic diagram of a charging system according to another embodiment of the invention.

In the aforementioned embodiments, the power supply 150 of the charging device 100 is a rechargeable battery disposed in the housing 110. However, as shown in FIG. 5, in some embodiments, the power supply 150 can be an external power source.

Figure 6:
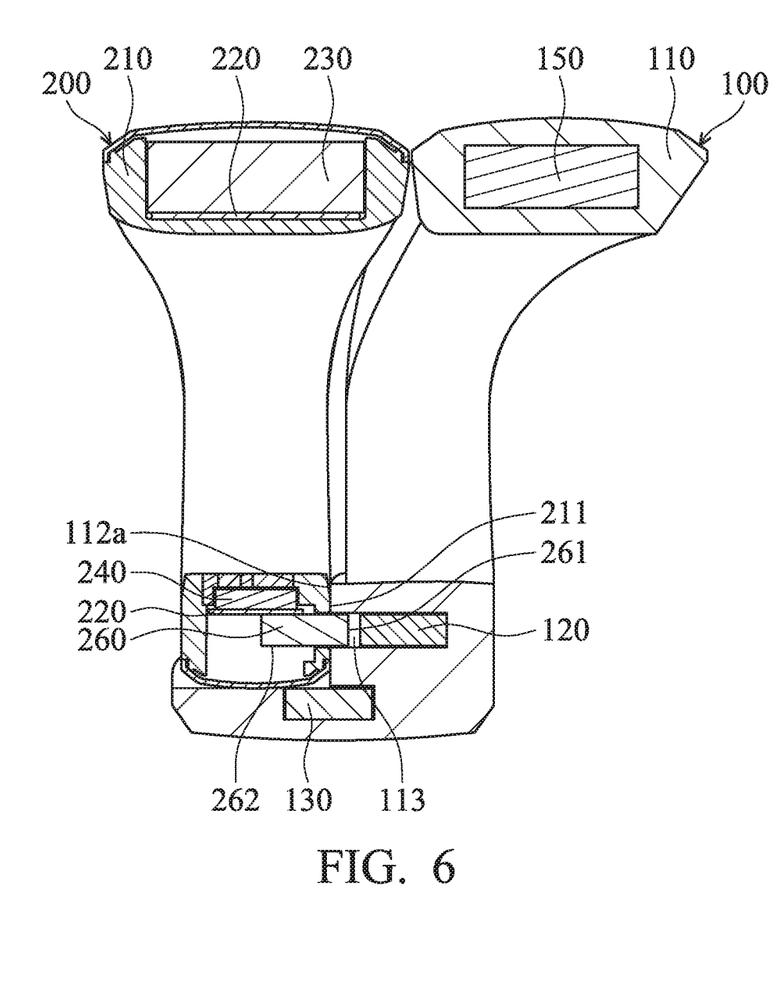
FIG. 6 is a schematic diagram of a charging system according to another embodiment of the invention.

Referring to FIG. 6, in another embodiment, the third magnetic member 260 protrudes from the lateral surface 211 of the main body 210, and the housing 110 of the charging device 110 has a depression 113. When the electronic device 200 is disposed on the charging device 100, the portion of the third magnetic member 260 protruding from the lateral surface 211 is accommodated in the depression 113. The combination between the charging device 100 and the electronic device 200 can be improved.

In summary, a charging system is provided. The electronic device can be steadily combined with the charging device by the arrangement of the first and second magnetic members in the charging device and the third magnetic member in the electronic device. Furthermore, the electronic device is combined with the charging device by the magnetic attractive force in such a way that the user can separate the electronic device from the charging device without using a great amount of force. Convenience of use can be achieved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A charging system, comprising:
   a charging device, comprising:
   a housing;
   a metal connector, disposed on the housing;
   a power supply, electrically connected to the metal connector;
   a first magnetic member, disposed on the housing; and
   a second magnetic member, disposed on the housing; and
   an electronic device, detachably disposed on the charging device, comprising:
   a main body;
   a power storage member, disposed on the main body;
   an electronic contact, disposed on the main body and electrically connected to the power storage member; and
   a third magnetic member, disposed on the main body, having a first surface and a second surface adjacent to the first surface, wherein when the electronic device is disposed on the charging device, the metal connector contacts the electronic contact, the first surface faces the first magnetic member, and the second surface faces the second magnetic member.

2. The charging system as claimed in claim 1, wherein the main body comprises a recess, and the first magnetic member protrudes from a surface of the housing, wherein when the electronic device is disposed on the charging device, at least a portion of the first magnetic member is accommodated in the recess.

3. The charging system as claimed in claim 1, wherein the housing comprises a depression, and the third magnetic member protrudes from a lateral surface of the main body, wherein when the electronic device is disposed on the charging device, at least a portion of the third magnetic member is accommodated in the depression.

4. The charging system as claimed in claim 1, wherein when the electronic device is disposed on the charging device, the distance between the central axis of the second magnetic member and the first magnetic member is shorter than the distance between the central axis of the third magnetic member and the first magnetic member.

5. The charging system as claimed in claim 4, wherein the third magnetic member has a predetermined length, and when the electronic device is disposed on the charging device, the distance between the central axis of the second magnetic member and the central axis of the third magnetic member is ½-⅕ of the predetermined length.

6. The charging system as claimed in claim 1, wherein when the electronic device is disposed on the charging device, the S pole of the first magnetic member faces the N pole of the third magnetic member, and the S pole of the second magnetic member and the N pole of the third magnetic member face a surface of the housing.

7. The charging system as claimed in claim 1, wherein when the electronic device is disposed on the charging device, the N pole of the first magnetic member faces the S pole of the third magnetic member, and the N pole of the second magnetic member and the S pole of the third magnetic member face a surface of the housing.

8. The charging system as claimed in claim 1, wherein when the electronic device is disposed on the charging device, the first magnetic member is aligned with the third magnetic member.

9. The charging system as claimed in claim 1, wherein the electronic device further comprises a film, when the electronic device is disposed on the charging device, the film is disposed between the first magnetic member and the third magnetic member.

10. The charging system as claimed in claim 1, wherein the power supply is a rechargeable battery or an external power source.

* * * * *